United States Patent [19]

Pasch

[11] 4,124,352
[45] Nov. 7, 1978

[54] DEVICE FOR REMOVING MOLDED MATERIAL FROM MULTI-PLATE MOLDS

[75] Inventor: Lambert M. Pasch, Aachen-Nuetheim, Fed. Rep. of Germany

[73] Assignee: Uniroyal A. G., Aachen, Fed. Rep. of Germany

[21] Appl. No.: 833,406

[22] Filed: Sep. 15, 1977

[30] Foreign Application Priority Data

Sep. 22, 1976 [DE] Fed. Rep. of Germany ....... 2642691

[51] Int. Cl.² .............................................. B29F 1/14
[52] U.S. Cl. .................. 425/556; 214/310; 425/140; 425/215; 425/437; 425/444
[58] Field of Search ............... 425/444, 436, 556, 437, 425/215, 216, 140; 214/2 BB, 310, 8.5 H, 8.5 G; 198/431

[56] References Cited

U.S. PATENT DOCUMENTS

| 2,741,797 | 4/1956 | Britton | 214/310 X |
| 2,923,976 | 2/1960 | Strauss | 425/556 X |
| 3,028,629 | 4/1962 | Focht et al. | 425/556 X |
| 3,277,522 | 10/1966 | Strauss | 425/436 X |
| 3,362,046 | 1/1968 | Blumer | 425/556 X |
| 3,408,689 | 11/1968 | Heiner | 425/556 |
| 3,669,592 | 6/1972 | Miller | 425/556 X |
| 3,702,138 | 11/1972 | Abrahmsson et al. | 425/436 X |

FOREIGN PATENT DOCUMENTS

416,248  6/1974  U.S.S.R. .................................. 425/444

*Primary Examiner*—Francis S. Husar
*Assistant Examiner*—William R. Briggs
*Attorney, Agent, or Firm*—N. P. Holler

[57] ABSTRACT

A device for removing molded articles and cured sprues from the cavity and cover plates, respectively, of a muiti-plate multi-cavity injection mold, includes a molded article ejection unit and a sprue extraction unit which, when the molding machine is opened, are juxtaposed, respectively, to a space between the mold cover and cavity plates and to a space between the mold cover plate and the face plate of the injection unit of the machine. A common carrier unit is provided for shifting the article ejection and sprue extraction units jointly into and out of the said spaces. In a preferred construction, the article ejection unit includes a plurality of ejector pins for the mold cavities, and means responsive to the arrival of the ejection unit at the end of its in-stroke for causing the ejector pins to penetrate the cavities from one face of the cavity plate. A trough-shaped guide unit movable with the ejection unit but into juxtaposition to the cther face of the cavity plate is also provided, to define a guide chute for the ejected articles. The sprue extraction unit includes a rotatably driven roller which during its in-stroke is in rubbing or wiping contact with the outside face of the mold cover plate for pulling the cured sprues therefrom. This abstract is not to be taken either as a complete exposition or as a limitation of the present invention.

45 Claims, 15 Drawing Figures

DEVICE FOR REMOVING MOLDED MATERIAL FROM MULTI-PLATE MOLDS

This invention relates to a device for the removal of molded material from an injection mold composed of a plurality of mold plates which include at least one plate provided with mold cavities and at least one plate serving as a mold cover plate and provided with sprue passages corresponding to the mold cavities, and of which, during the molding operation, the cover plate lies against the molding compound source unit of a molding machine. More particularly, the invention relates to such a device by means of which the molded articles in the mold cavity plate and the cured sprues in the mold cover plate can be conjointly removed from the respective plates.

There is known a molding machine equipped with a device for the mechanical extraction of cured sprues from a mold cover plate of a multi-plate mold after the molding machine has been opened, which includes a rotationally moving or rotating roller that is translated over the face of the mold cover plate which previously was in engagement with the molding compound source unit. During this movement, the roller wipes against the cured sprues projecting from the sprue passages of the mold cover plate, so that the sprues are pulled out of the latter.

In that same machine, however, the molded articles themselves, which are situated in the mold cavities of the cavity plate of the multi-plate mold, are ejected manually from the cavity plate. Such a manual ejection operation is, of course, relatively time consuming. Moreover, when the mold is opened the narrowness of the available space between the mold plates makes ready access to the mold cavities and inspection thereof very difficult. Still further, the operator has to work in the radiating heat zone of the heated mold unit.

These problems exist even in molding machines making use of manually actuated mechanical accessories for the removal of molded articles, namely ejection means in the form of pin-equipped ejector plates or ejector hooks. Such ejection means frequently cause the molded articles to be damaged, and on occasion portions of the molded articles may also remain as residues in the mold cavities. The same also holds true in the case of manually removed sprues. Such defects inevitably result in damage to the mold cavities and lead to the result that defective molded articles are produced.

It is an object of the present invention, therefore, to provide a molding machine which utilizes multi-plate molds and in which the aforesaid drawbacks and disadvantages are avoided.

More particularly, it is an object of the present invention to provide a molded material removal device which can properly perform its functions even in the narrow spaces between the mold bottom, cavity and cover plates and between the mold cover plate and the face plate of the injection unit, and by means of which not only can the molded articles be faultlessly, rapidly and dependably ejected entirely mechanically from the opened mold, but also the sprues, so that the incidence of rejects of molded articles is effectively minimized.

Generally speaking, the objectives of the present invention are achieved through the provision of a device including a sprue extraction unit, a molded article ejection unit and a molded article guide unit all supported by a common carrier unit and arranged relative to one another so as to be juxtaposed, respectively, to the access spaces existing, when the mold is opened, between the face plate of the molding compound source or injection unit and the mold cover plate, between the mold cover and cavity plates, and between the mold cavity and bottom plates, with the carrier unit being arranged for reciprocal movement perpendicularly to the direction of opening and closing of the mold so that the sprue extraction unit, the molded article ejection unit and the guide unit are likewise movable, in the course of a mold-emptying operation, parallel to the mold plates and into and out of the respective spaces mentioned above.

For the purposes of the present invention, the emptying of the mold can be effected either by purely mechanical means or by a combination of mechanical and pneumatic means. Within this concept, it is preferred to use a sprue extraction unit of the roller type analogous to that referred to above, and a molded article ejection unit which includes a series of ejector pins, but these pins may be replaced or supplemented by a series of pressurized air jets. The sprue extraction unit and the combination molded article ejection and guide units are traversed jointly and parallel to one another over the mold cover plate and the mold cavity plate, respectively, as the carrier unit is moved by its associated, preferably fluid pressure actuated, drive means. Concurrently, rotation of the roller of the sprue extraction unit during its traversing movement over the mold cover plate is provided by an electric motor and associated power transmission means also supported by the carrier unit, and a transverse displacement of the ejection unit toward the mold cavity plate at the end of the traversing movement of the ejection unit over the cavity plate is provided by means of a camming mechanism cooperating with a linkage lever system by which the ejection unit is mounted on the carrier unit. The device according to the present invention thus ensures that the ejection of the molded articles and the extraction of the sprues from the respective mold plates is effected rapidly and reliably and in such a fashion that the molded articles are additionally protected against damage, soilage and loss. The ejection and extraction operations can, of course, take place essentially simultaneously, but preferably the arrangement is such that, in terms of timing, the extraction of the sprues from the mold cover plate is completed shortly prior to the ejection of the molded articles from the mold cavity plate.

Advantageously, the carrier unit for the sprue extraction unit and the molded article ejection and guide units comprises a slide-shaped carriage mounted in suitable guide tracks of the rigid frame appropriately mounted on the stationary cross-head of the molding machine. The carriage can additionally be stabilized in its movements by means of guide rods or other suitable means mounted on the machine frame, in particular the stationary machine cross-head.

In order to assure an efficacious lateral displacement of the ejection unit toward the mold cavity plate for the ejection of the molded articles from the mold cavities, it is deemed advantageous for the ejection unit to be mounted on the carrier unit by means of a dual twin-lever linkage system, and for a pair of cam rollers associated with the linkages to be provided in such a fashion that, at a given point of the inward traverse of the ejection unit these rollers come into engagement with a pair of stationary cam elements or abutments secured, for example, to the mold cavity plate. In this way it is possible, when the ejector elements are properly juxtaposed to the respective mold cavities, to limit the traversing movement of the ejection unit parallel to the plane of the mold cavity plate and to change it at the desired instant into a movement perpendicular or substantially perpendicular to the plane of the mold cavity plate.

The guide unit for molded articles ejected from the mold cavities (whether by being pushed out or blown out) comprises a channel-shaped or trough-shaped member which is coextensive with and open toward the mold cavity plate. The arrangement preferably is such that at the end of the inward traversing movement of the guide unit, the channel member overlies the entire expanse of the mold cavity plate at the surface thereof facing toward the mold bottom plate and cooperates with the cavity plate to define a laterally closed passageway or chute adapted to guide the ejected molded articles to a suitable receiving location. In this way, the ejected articles are protected from coming into contact with, for example, greased machine standards or oily parts, which would tend to damage the molded articles, especially those made of rubber. At the receiving location, the ejected molded articles may simply be collected in a suitable container, but advantageously they may first be deposited onto a monitoring scale for the purpose of enabling the weight of the ejected molded articles formed during a given mold cycle (or number of mold cycles) to be compared with a theoretical value. It will be understood, of course, that the ejected molded articles are collected, apart from the sprues, either in separate containers or in containers with divided sections.

The foregoing and other objects, characteristics and advantages of the present invention will be more clearly understood from the following detailed description when read in conjunction with the accompanying drawings, in which.

Referring now to the drawings in greater detail, the present invention is a molded material removal device 20 (FIGS. 1 to 4) for a molding machine such as an injection or transfer molding machine 21 of the type used with a multiplate mold 22 for the manufacture of flash-free molded articles made of elastomers or similar molding compounds. The molding machine 21 has a stationary cross-head 23 and a stationary anchor block 24 both rigidly mounted on and affixed to a suitable base or foundation 25 and interconnected by suitable tie-rods 26 (only two are shown but at least four are usually provided). Slidably mounted on the tie rods 26 is a movable cross-head 27 which is connected to the anchor block 24 by a toggle lever linkage 28. The stationary cross-head 23 supports an injection unit 29 the discharge end of which faces the movable cross-head 27, and an injection cylinder 30 supported on the base 25 at 31 and having an intake funnel 32 and suitable internal feed means, usually a hydraulic pressure-operated piston arrangement (not shown), is provided to enable the molding compound to be fed to the injection unit 29.

The mold 22 is disposed between the cross-heads 23 and 27 and includes a middle plate 33 in which are provided multiple suitably distributed mold cavities 33a, a top or cover plate 34 in which are provided correspondingly distributed sprues or inlet passageways 34a for the individual mold cavities, and a bottom plate 35 which in the illustrated form is shown as having a plurality of likewise distributed cavity-closing end plugs or protuberances 35a. Of these plates, the mold bottom plate is secured to the movable cross-head 27 while the mold cavity and cover plates are slidably supported on suitable guide rods (not shown) arranged between the cross-heads and providing means (also not shown) for effecting the movement of the mold cavity and cover plates to the respective separated positions thereof shown in FIGS. 2 to 4 in response to the opening of the molding machine.

In cooperating relation to the mold 22, the injection unit 29 is provided at its discharge end facing the mold cover plate 34 with an elastic, thermally nonconductive, insulation plate 36. The purpose of the latter, which is provided with a plurality of through-passages (not shown) corresponding to those in the mold cover plate 34, is to ensure that during a molding cycle, while that portion of the molding compound which has been injected into the closed mold 22 proceeds to cross-link or vulcanize, no heat can flow back into the injection unit, so that the remainder of the molding compound in the injection unit remains plastic and does not cure.

Figure 2:
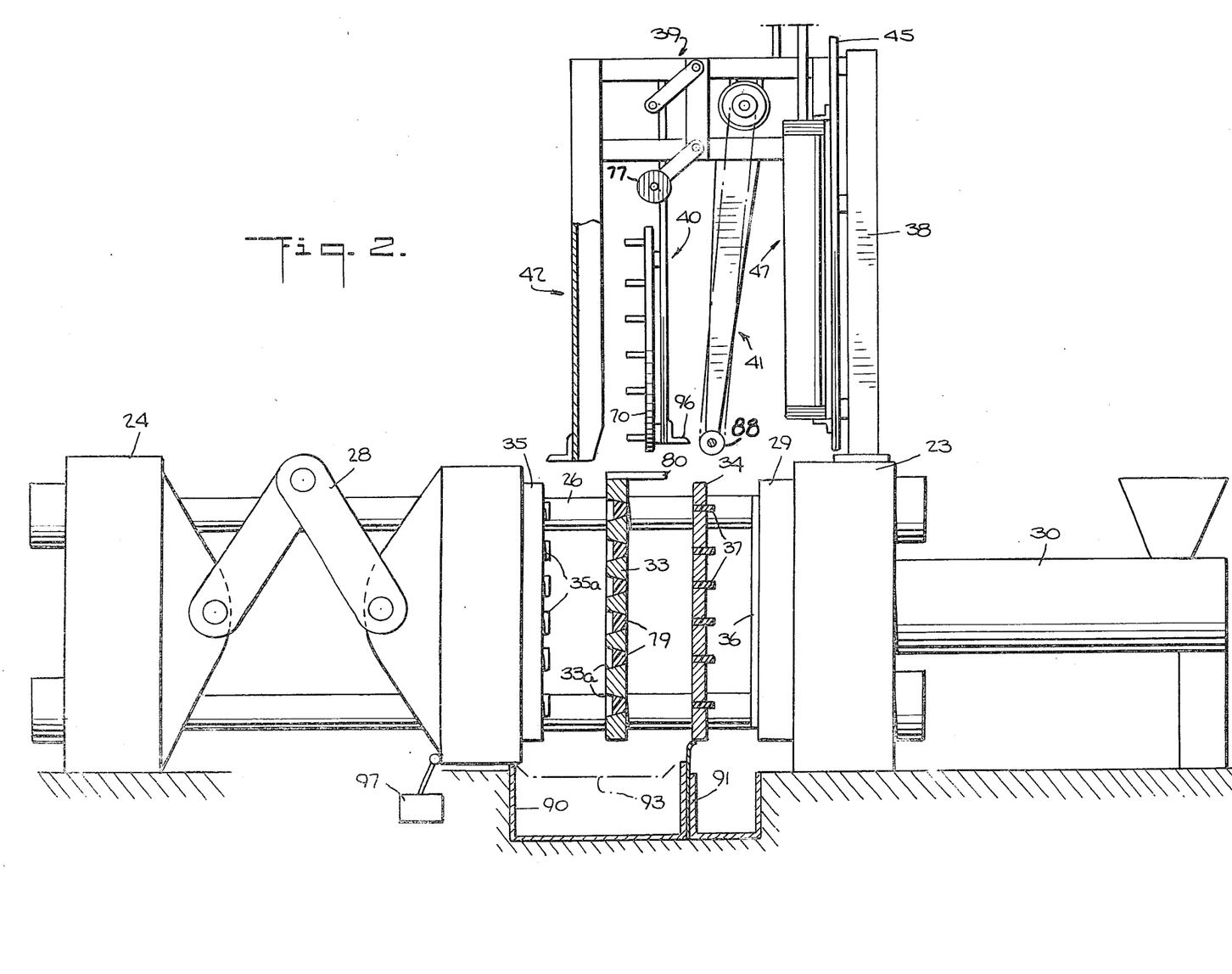
FIG. 2 is a similar view of the machine but shows the same in its open state with the mold plates separated from one another and the injection unit of the machine, and further illustrates the starting juxtaposition of the components of the removal device to the respective spaces defined by the opened mold.
Figure 3:
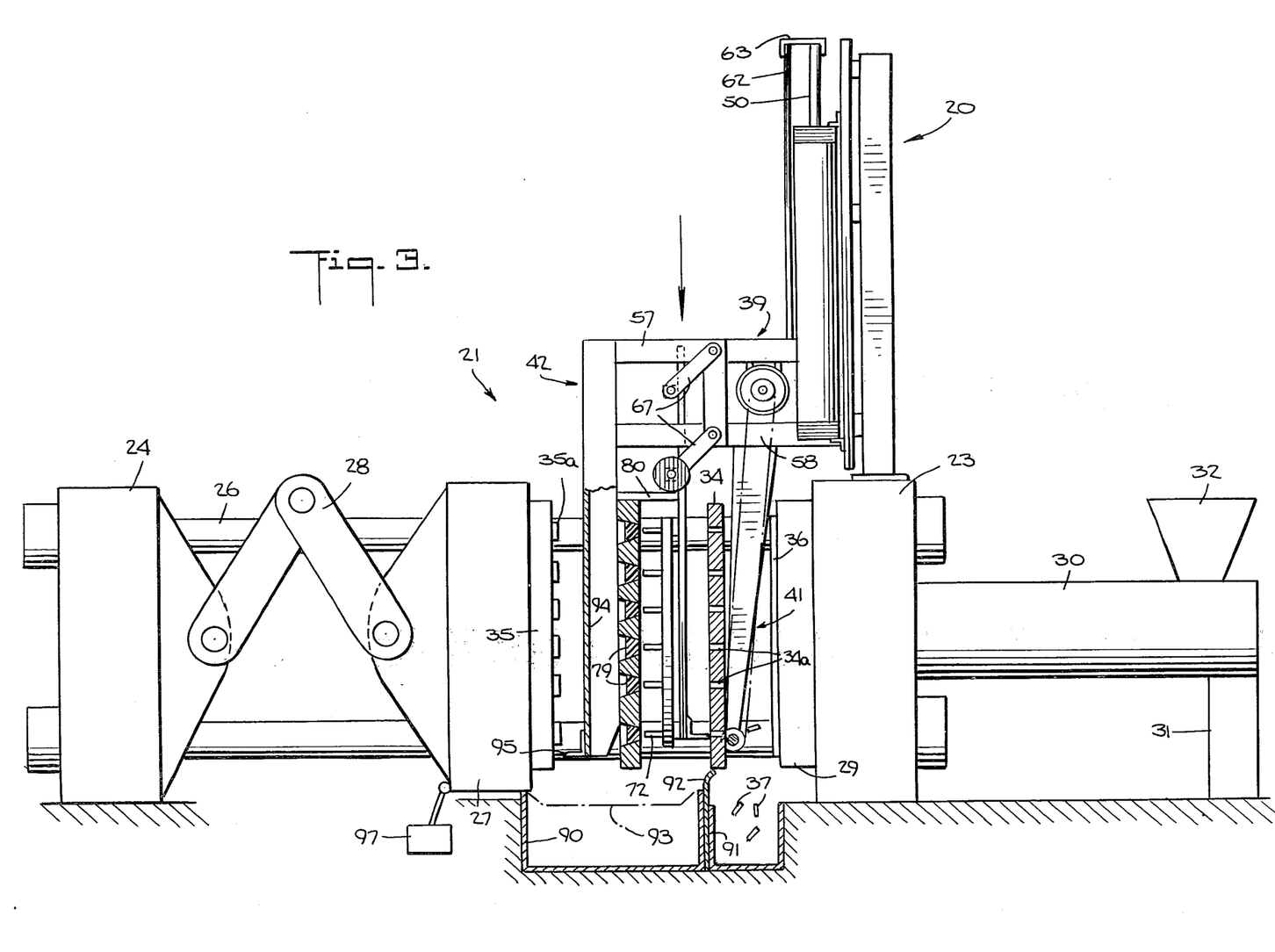
FIGS. 3 and 4 are views similar to FIG. 2 and illustrate the removal device protracted to its active or working position but in different stages of its operation.
Figure 4:
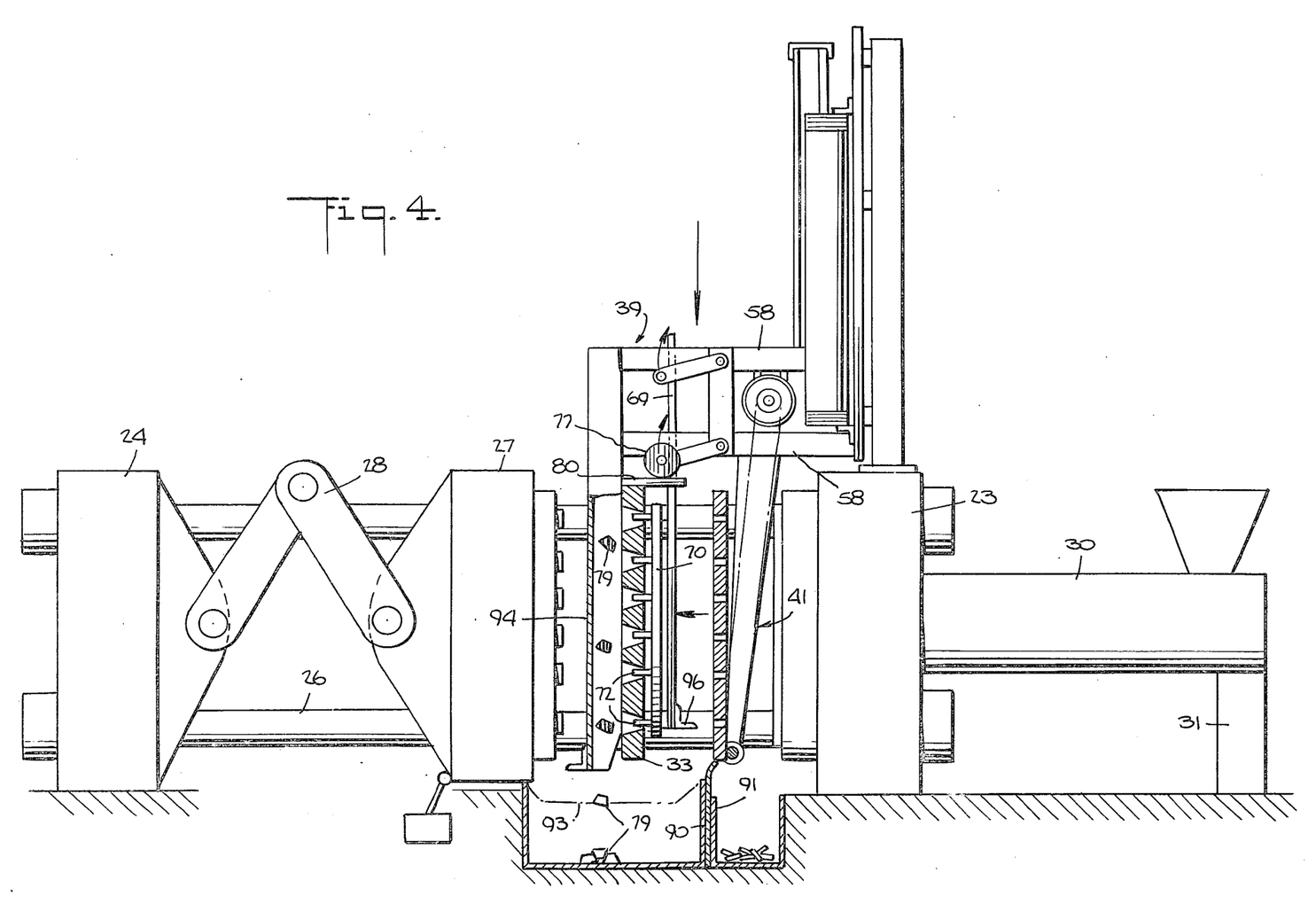

When the molding machine 21 opens at the end of a molding cycle upon retraction of the movable cross-head 27 and the mold plates 33 and 34 separate from one another and from the mold bottom plate 35 and the insulation plate 36, the cured molding material in the passages of the mold cover and insulation plates separates in the form of waste sprues 37 from the non-vulcanized portions of the molding compound in the insulation plate passages and also from the actual molded articles 38 in the mold cavities 33a. As shown in FIG. 2, those portions of the waste sprues 37 which came out of the insulation plate 33 project beyond the surface of the mold cover plate facing the insulation plate.

It should be understood, of course, that although the molding machine 21 has been illustrated in the drawings as utilizing a horizontal press stroke and vertical mold plates, the basic principles and manner of operation would be essentially the same in a machine utilizing a vertical press stroke and horizontal mold plates.

The molded material removal device 20 according to the present invention includes a mounting post or standard 38 rigidly secured to the stationary cross-head 23 of the molding machine, and a carrier unit 39 which supports a molded article ejection unit 40, a sprue extraction or clearing unit 41, and a molded article guide unit 42. The carrier unit is arranged, in a manner to be explained presently, for reciprocal movement with the units 40, 41 and 42 supported thereby, toward and away from the location of the mold 22.

Figure 5:
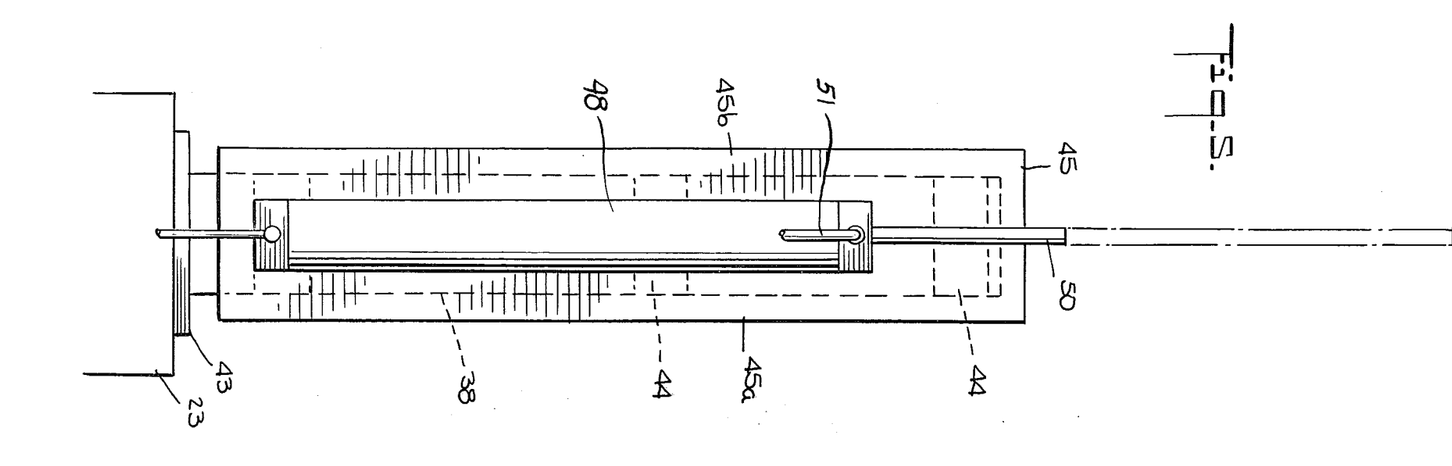
FIGS. 5 and 6 are a front elevation and a side elevation, respectively, of the mounting member and the drive means for the carrier unit of the removal device.
Figure 6:
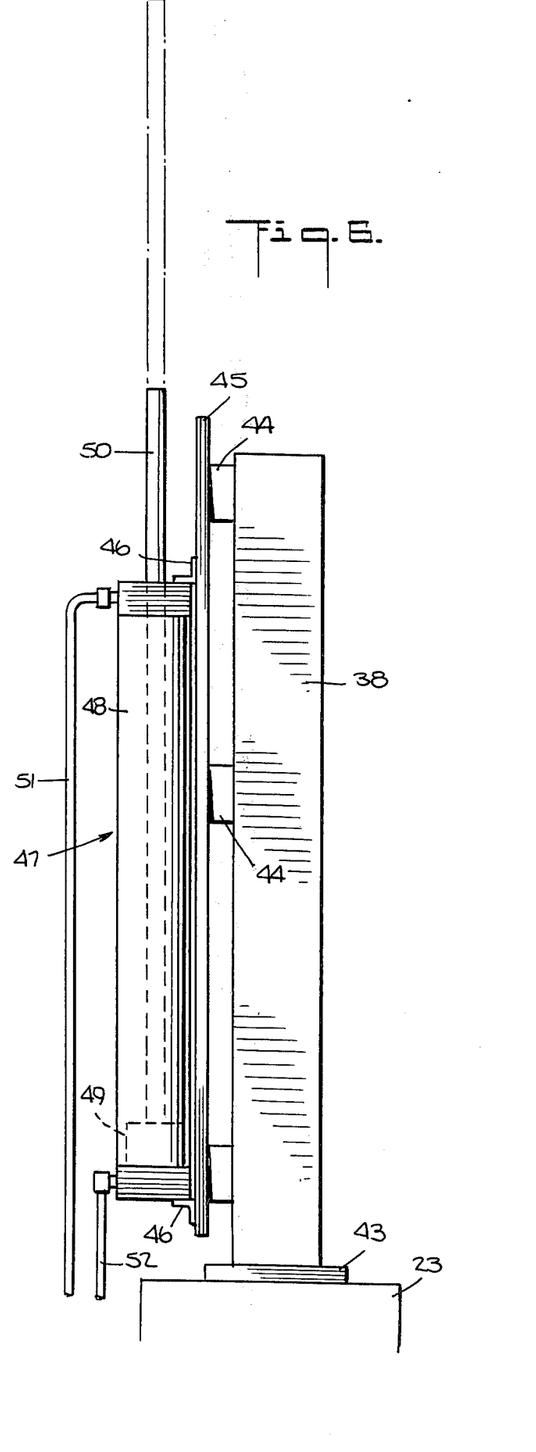

Referring now more particularly to FIGS. 5 and 6, the post or standard 38 is preferably a column of square or rectangular cross-section and made of metal plates mounted on a base plate 43 rigidly affixed to the stationary cross-head 23. Extending frontwardly from the post 38 are several vertically spaced mounting or spacer brackets 44 which in turn support a vertical guide plate 45 which is somewhat wider than the post 38. At its front face the guide plate 45 supports, by means of angle brackets 46 or the like, a drive or operating means 47 for carrier unit 39. The drive means 47 preferably is a pneumatic or hydraulic pressure-actuated device, including a cylinder 48 and a piston 49 reciprocally slidable therein. A piston rod 50 connected to the piston extends out of the upper head of the cylinder 48. Admission of fluid pressure into or exhaustion thereof from the opposite ends of the cylinder is effected by means of suitably valve-controlled (not shown) piping or ducts 51 and 52.

Figure 7:
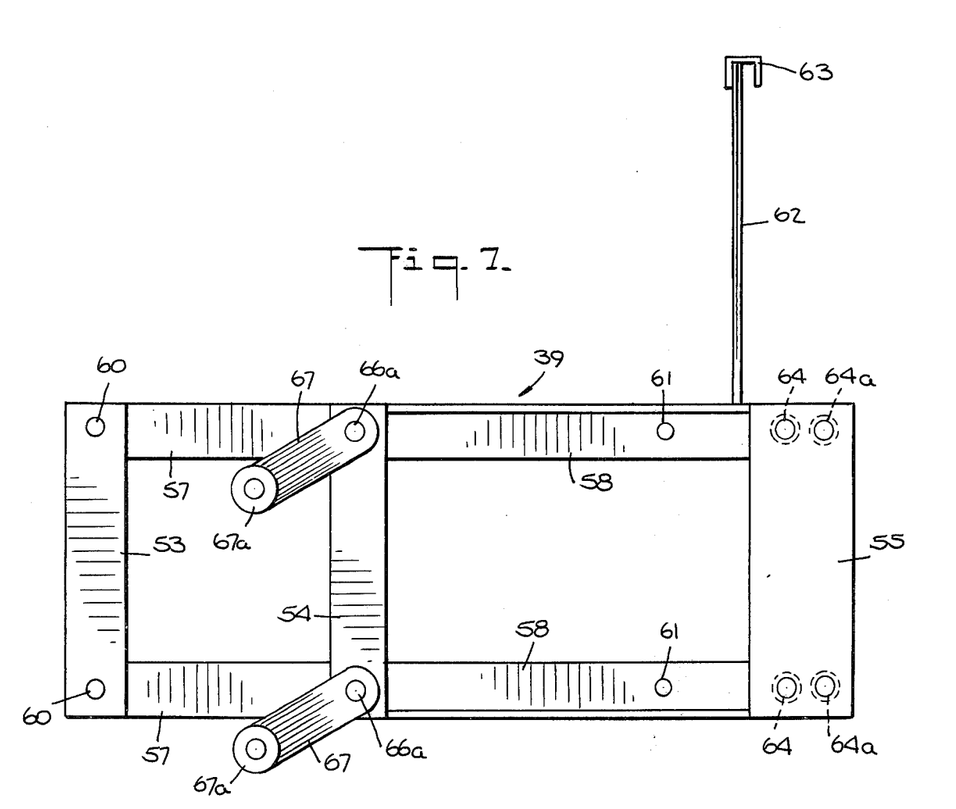
FIGS. 7 and 8 are a side elevational view and a top plan view of a portion of the carrier unit of the removal device.
Figure 8:
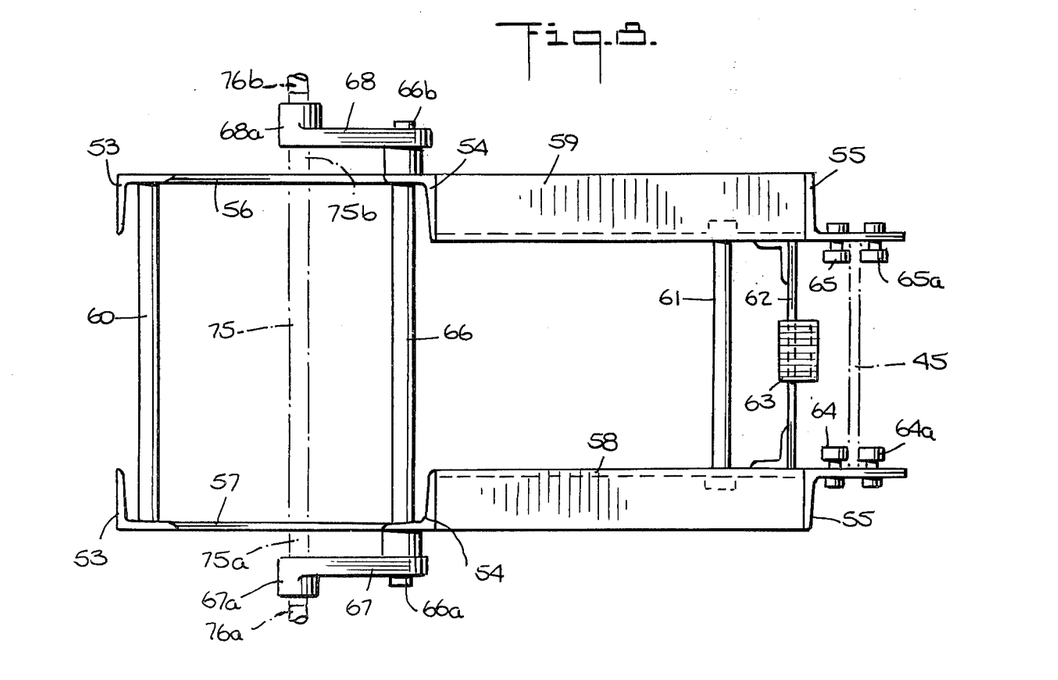

The carrier unit 39, which is best shown in FIGS. 7 and 8, includes a frame constructed of a plurality of pairs of vertical members 53, 54 and 55 of sectional steel, respective pairs of vertically spaced flat bar-shaped, cross-braces 56 and 57 each interconnecting one of the members 53 and the associated member 54 on the same side of the frame at the top and bottom ends of said members, and respective pairs of vertically spaced sectional steel cross-braces 58 and 59 each interconnecting one of the members 54 and the associated member 55 on the same side of the frame at the top and bottom of those members. Suitable pairs of cross-bolts or spacer bars 60 and 61 interconnect the paired members 53 and the paired braces 58 and 59, respectively. Adjacent one end, the frame of the carrier unit 39 is provided with an upwardly extending rigidly secured plate member 62 which at its uppermost end supports a bracket 63 to which the top end of the piston rod 50 is connected.

Suitably journaled on the rearwardly extending vertical webs of the members 55 at both the top and bottom edge regions thereof are respective opposed and axially aligned pairs of horizontally spaced guide rollers 64-64a and 65-65a. The spacings between the various paired rollers are identical and just sufficient to smoothly slidably accommodate therebetween the opposite lateral edge regions 45a and 45b (FIG. 5) of the guide plate 45 affixed to the post or standard 38, as illustrated in FIG. 8 where the plate is shown in phantom outline only.

It will be apparent from the foregoing that the admission of fluid pressure into one end or the other of the cylinder 48 will cause the piston 49 to be displaced accordingly so as to move the carrier unit 39, together with all its components and the other units 40, 41 and 42 supported thereby, either into or out of its rest position, as the case may be. During such movement, therefore, the interengagement between the guide rollers 64-64a and 65-65a and the guide plate 45 provides for an accurate guidance of the carrier unit 39 with respect to the post 38, even at rapid speeds, and it also ensures stability of the various units of the removal device 20 during the performance of their respective functions (still to be described).

Referring further to FIGS. 7 and 8, suitably mounted in the frame of the carrier unit 39 and extending between the pair of members 54 at the top and bottom ends thereof are two cross-shafts 66 which project exteriorly of the frame and terminate in respective pairs of trunnions or bearing pins 66a and 66b. Pivotally mounted on each of the opposite pairs of shaft ends or trunnions is a respective pair of levers or link members 67 and 68 which at their free ends are provided with bushings 67a and 68a. The purpose and functions of the linkage or lever system 67-68 will be more fully explained presently in conjunction with the description of the molded article ejection unit 40.

Figure 9:
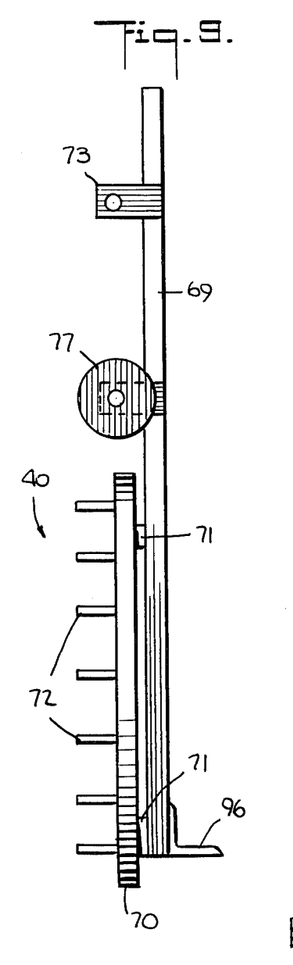
FIGS. 9 and 10 are a side elevational view and a front elevational view, respectively, of one type of molded article ejection unit of the removal device.
Figure 10:
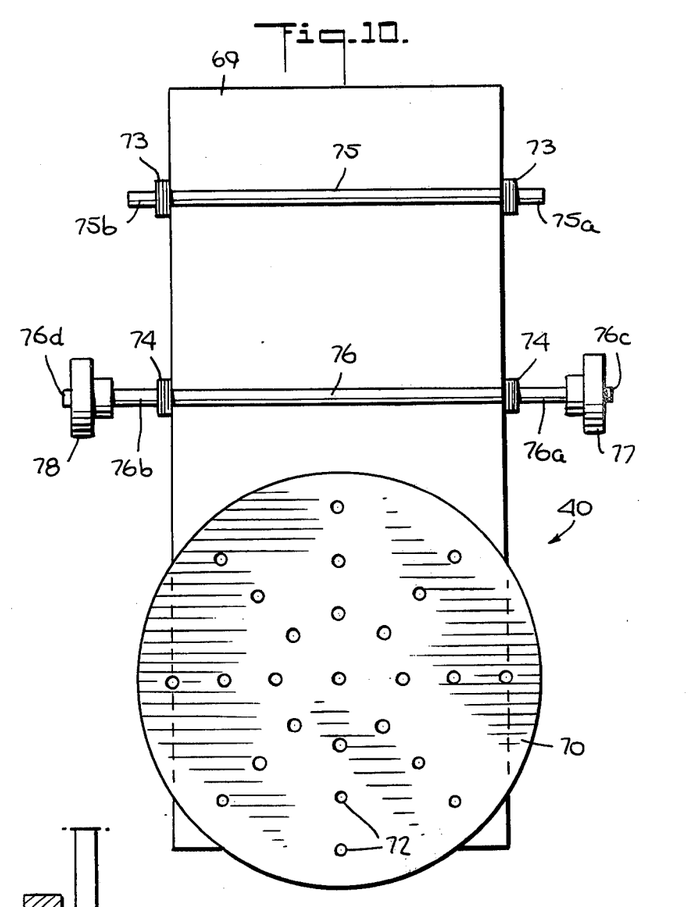

Referring now to FIGS. 9 and 10, the ejection unit 40 comprises a support frame 69 and an ejector plate 70 secured to the support frame. The support frame may be a steel plate, as shown, but preferably is made up of sectional steel and sheet metal in order to minimize its weight. In view of the function the frame is to perform, however, it must be sufficiently rigid in construction to ensure that even at the minimum possible thickness (or front to rear depth) which can be used given the relatively narrow space available between the mold plates 33 and 34, the frame will be capable of transmitting the frequently substantial ejection force without distortion.

The ejector plate 70 is secured to the front side of the support frame 69 by means of brackets 71 and is shaped and dimensioned in such a way as to cover the entire expanse of the mold cavity arrangement of the mold plate 33. Thus, the ejector plate is shown as being circular in outline, but it may, of course, have any other desired configuration, and it is provided, depending on the number and distribution of the mold cavities 33a, with a correspondingly distributed like number of ejector pins 72 that project preferably perpendicular to the ejector plate. The mounting arrangement for the ejector plate 71 is such as to permit its replacement so that, in the case of a changeover to a different type of mold, all that is needed in order to adapt the entire apparatus to the new mold is to exchange only the ejector plate for a correspondingly different ejector plate fitting the new mold.

In the region adjoining the frame of the carrier unit 39, the support frame 69 of the ejection unit 40 is provided at its opposite sides with upper and lower pairs of lateral bearing brackets 73 and 74. Fixedly supported by these brackets and extending across the full width of the supporting frame 69 to beyond its lateral edges are respective linkage rods 75 and 76. The regions 75a and 75b of the rod 75 just beyond the bearing brackets 73 are received in and pivotally support the bushings 67a and 68a of the upper link members 67 and 68, as shown in phantom outline in FIG. 8, and correspondingly the regions 76a and 76b of the rod 76 just beyond the bearing brackets 74 are received in and pivotally support the bushings 67a and 68a of the lower link members 67 and 68. The rod 76 is somewhat longer than the rod 75, however, and on its outermost extremities 76c and 76d rotatably supports a pair of rollers or equivalent cam follower-like elements 77 and 78.

It will be apparent from the foregoing that the double link levers 67 and 68 constitute a parallelogram suspension system which interconnects the frame 69 of the ejection unit 40 to the frame 53 etc. of the carrier unit 39. This mode of attachment is provided to ensure that the support frame 69 of the ejection unit can move relative to the frame of the carrier unit and hence relative to the mold cavity plate 33 without any lateral twisting or swinging out. On the other hand, the purpose of the rollers 77 and 78 is to ensure that at a certain point during the movement of the ejection unit 40 from its rest to its working position, the support frame 69 and therewith the ejector plate 70 are shifted in a direction perpendicular to the plane of the mold cavity plate 33 so as to eject the molded articles 79 out of the mold cavities 33a. To this end, there are provided, as adjuncts of the molding machine, respective stationary plate-like abutments 80 which are arranged at suitable locations between the stationary and movable cross-heads 23 and 27 of the machine, in position to be engaged by and to deflect the rollers 77 and 78. In the illustrated form of the invention, the abutments 80 are secured to the periphery of the mold cavity plate 33, but they can be arranged on the support means for the mold plates or on an auxiliary structure adjacent the path of movement of the cross-head 27.

It will also be apparent that as a result of the use of the link lever system 67-68 etc., the ejection operation does not require a drive of its own. Moreover, by properly selecting the starting angular orientation of the twin lever pairs 67-68 between the frame of the carrier unit 39 and the support frame 69 of the ejection unit 40, or by an adjustment in the elevation of the abutments 80, or by a combination of these procedures, it is possible to adjust the actual ejection stroke of the ejector plate 70 to any desired value.

As a possible refinement of the ejection unit 40, it is contemplated by the present invention to utilize an air blast device either in lieu of or in combination with mechanical ejector pins. A pneumatic ejector device 70' is illustrated schematically in FIG. 11 as having an interior manifold or passageway 70a to which pressurized air can be fed in any suitable fashion (not shown) and in communication therewith a plurality of outwardly open nozzles or orifices 70b identical in number and distribution to the mold cavities.

Figure 12:
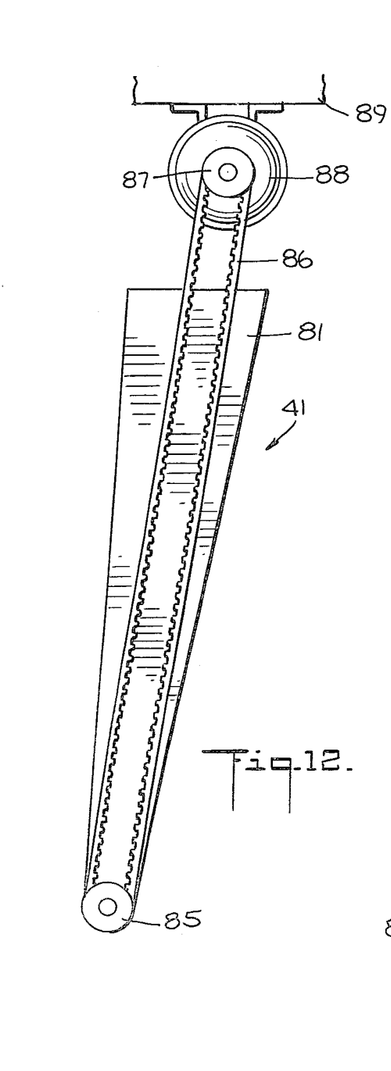
FIGS. 12 and 13 are a side elevational view and a front elevational view, respectively, of the sprue extraction unit of the removal device.
Figure 13:
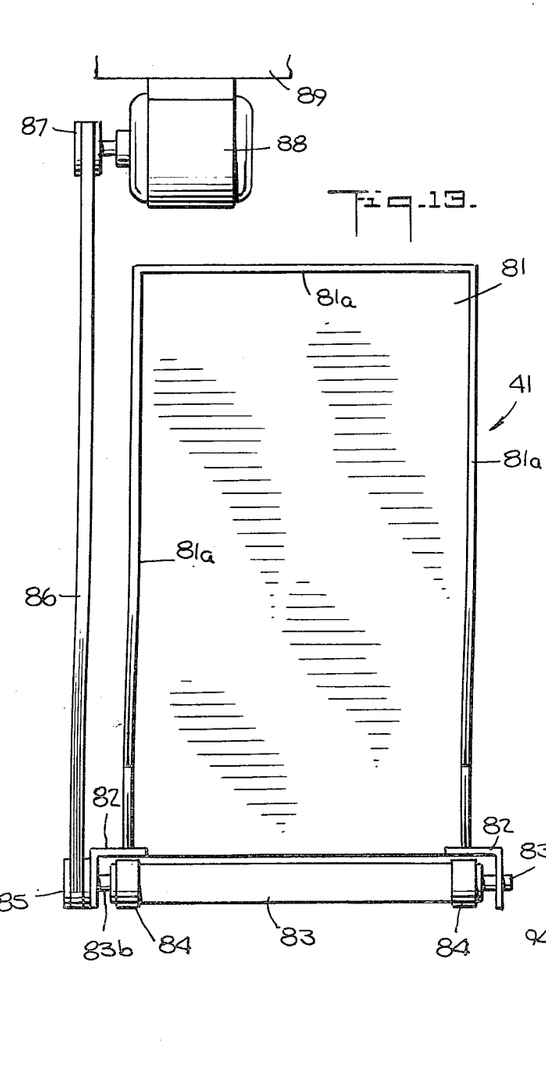

The sprue extraction unit 41 is best shown in FIGS. 12 and 13 and includes a support frame 81 secured at its upper end to the lower braces 58 and 59 of the frame of the carrier unit 39. In view of the small amount of available space, the support frame 81 is made of plate or sheet metal with its lateral marginal portions folded up, for stiffening purposes, into the form of upstanding flanges 81a. At its lower end, the support frame 81 carries a pair of brackets 82 in which are rotatably journaled the end axles or shafts 83a and 83b of a wiping roller 83. Adjacent its opposite ends, the roller 83 is encircled by a pair of annular bearing members 84 which are freely rotatable independently of the roller by means of interposed ball bearings (not shown). The arrangement is essentially such that the bearing members 84 are arranged to run along the surface of the mold cover plate 34 directed toward the insulation plate 36 and are so dimensioned as to space the roller 83 slightly from the said surface of the mold cover plate 34. Secured to the roller axle 83b outside of the associated bracket 82 is a toothed pulley 85 around and in mesh with which is trained one end region of an endless toothed power transmission belt 86. The other end region of the belt is trained around and in mesh with a toothed pulley 87 driven by an electric motor 88 which is secured to the frame of the carrier unit 39 at 89.

In the operation of this unit, the roller 83 is driven by the motor 88 so that its direction of rotation, as viewed at the surface of the cover plate 34, is counter to the direction of motion of the unit from its rest to its working position across the surface of the cover plate. In the process, the roller engages and wipes over the projecting portions of the sprues 37 and pulls the same out of the passageways 34a.

Figures 14, 15:
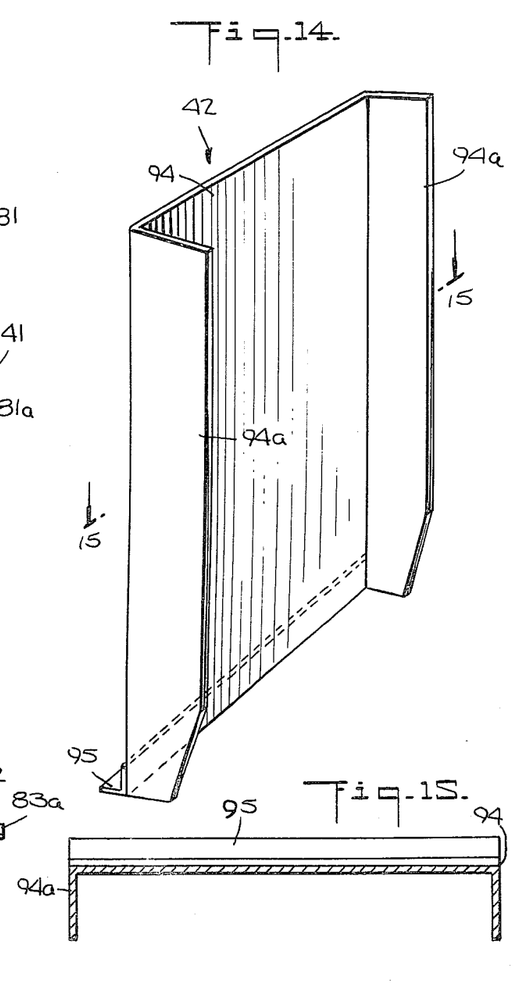
FIG. 14 is a perspective view of the molded article guide unit of the removal device.
FIG. 15 is a cross-sectional view taken along the line 15—15 in FIG. 14.

Referring now again to FIGS. 1 to 4, it is contemplated by the present invention that the ejected molded articles 79 and the extracted sprues 37 will be collected in respective containers 90 and 91 suitably arranged below the location of the opened mold 22 on opposite sides of a partition 92. It is further contemplated that an interpolated monitoring scale 93 (indicated schematically and in phantom outline only) may be provided between the mold cavity plate 33 and the container 90 to enable the weight of the ejected molded articles to be compared with a theoretical value of the yield for a given molding cycle, in such an arrangement that, if the result of the comparison is positive, a suitable control device (not shown) will enable the next subsequent molding cycle to be initiated. It is to ensure, therefore, that none of the molded articles will be lost during the ejection operation, that the removal device 20 is further provided with the molded article guide unit 42. This unit, which is best shown in FIGS. 14 and 15, consists of a cross-sectionally U-shaped sheet metal member 94 which is fixedly connected with the carrier unit 39 at the free end of the frame thereof remote from the post 38, with the open side of the member 94 being arranged to face the mold cavity plate 33. The member 94 is positioned so as to be able to enter the space between the mold cavity and bottom plates 33 and 35 when the carrier unit 39 is advanced from its rest to its working position, with the side walls or flanges 94a of the member 94 engaging the proximate face of the mold cavity plate. The member 94 and the mold cavity plate 33 thus coact to define an all-around closed yet downwardly open guide chute through which the ejected molded articles 79 can fall into the collector receptacle or container 90 (or the scale 93) situated therebeneath.

It should also be noted that the guide unit 42 provides yet another advantage, in that it prevents the ejected molded articles from coming into contact with the lubricated surfaces of the movable cross-head 27 of the press, which might result in the soiling of such articles and their ultimate loss in the form of rejects. The arrangement of the sheet metal partition 92 directly beneath the open mold position of the mold cover plate 34 guarantees, of course, that the sprues 37 and the molded articles 79 remain separated following their removal from the mold by being constrained to drop separately into the two collector containers 91 and 90, respectively. As a result, the need for performing a subsequent separating or sorting cycle is avoided.

Figure 11:
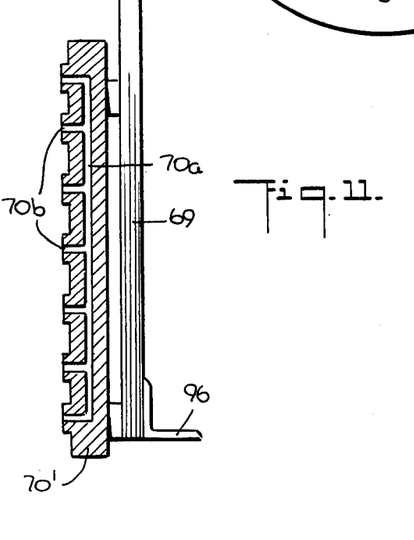
FIG. 11 is a fragmentary side elevational view, similar to FIG. 9, of a modified embodiment of the ejection unit of the removal device.

Yet another advantage provided by the present invention is that at the lower free ends of the outside face of the member 94 and the support frame 69 of the ejection unit 40 there are provided elastic stripper ledges 95 (FIGS. 14–15) and 96 (FIGS. 9 and 11). These are designed to strip off molded articles that might possibly adhere to the bottom and cover plates 35 and 34 of the mold when the latter is opened.

Figure 1:
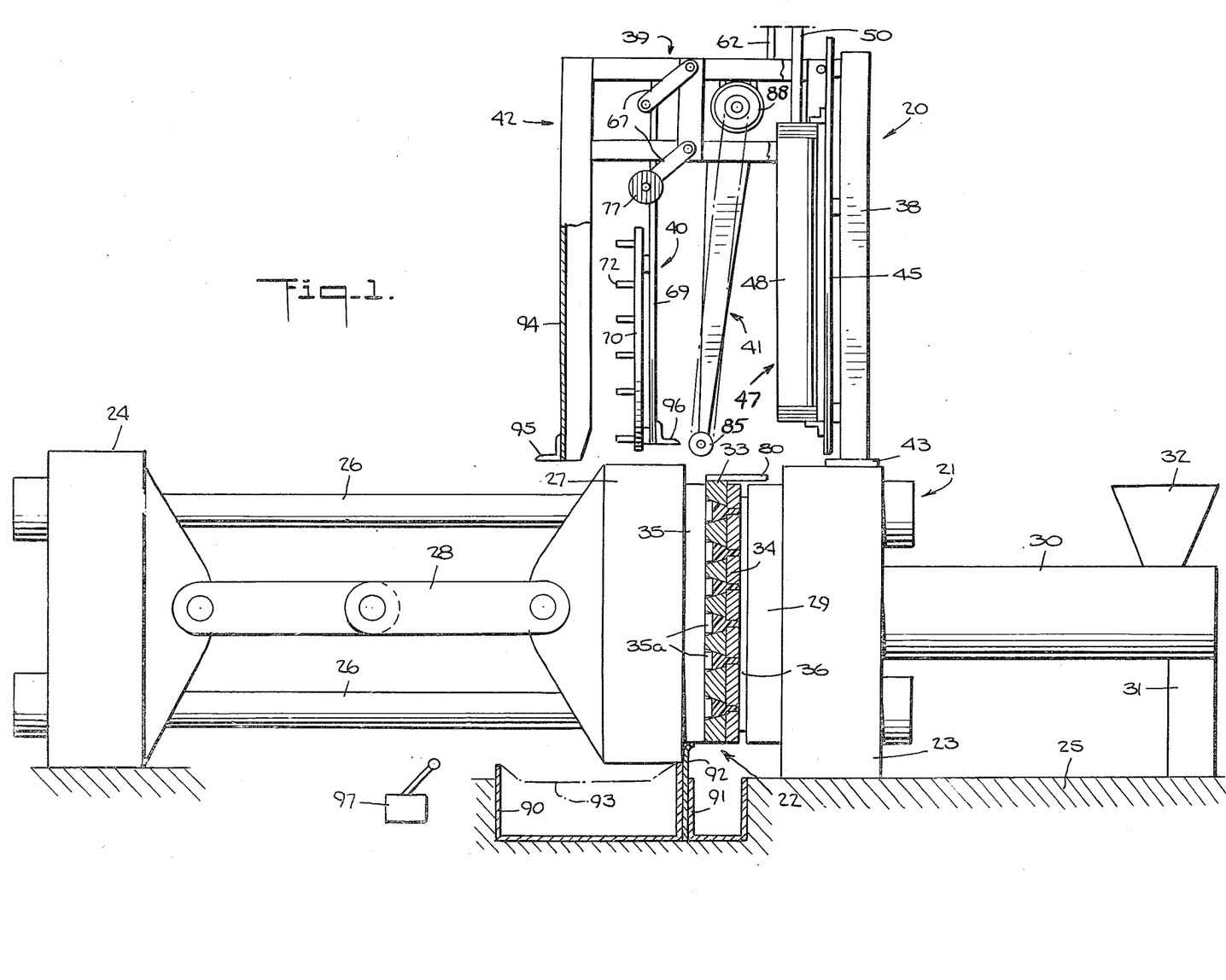
FIG. 1 is a schematic side elevational view of an injection molding machine in the course of a molding operation, i.e. with the mold (which is shown partly in section) closed, and shows the molded material removal device according to the present invention retracted to its inactive or rest position in overhanging relation to the cross-heads of the machine.

The operation of the molded material removal device will now be described with reference to FIGS. 1 to 4. The rest position of the device is illustrated in FIG. 1, with the piston 49 of the drive means 47 being in the upper terminal position of its stroke in the cylinder 48.

As soon as the movable cross-head 27 of the molding machine has been fully retracted (FIG. 2), it activates a mechanical or electrical limit switch 97 which causes fluid pressure, e.g. compressed air, to be admitted into the upper end of the cylinder 48. The carriage unit 39 of the device 20 thus is lowered. Accordingly, since the individual units 40, 41, and 42 were at that time juxtaposed (FIG. 2) to the spaces defined between the insulation plate 36 and the mold cover plate 34, between the latter and the mold cavity plate 33, and between the mold cavity plate and the mold bottom plate 35, respectively, the said units enter (FIG. 3) and move in parallel paths downwardly through those spaces.

Concurrently with the beginning of this movement, rotation of the roller 83 of the sprue extraction unit 41 is begun, and as the roller is translated over the outside face of the mold cover plate 34, it acts to pull the sprues 37 therefrom, enabling them to fall into the container 91. Advantageously, the roller 83 may be arranged slightly oblique with respect to its direction of travel.

After the carrier unit has moved through a predetermined portion of its descent, i.e. when the ejector plate 70 has attained its proper position for the ejection operation, with the pins 72 aligned with the cavities of the mold cavity plate 33, the rollers 77 and 78 of the ejection unit 40 come up against the stops or abutments 80. As the carrier unit's movement then continues, both the sprue extraction unit 41 and the molded article guide unit 42 continue to be lowered. Because of the camming action of the abutments 80 on the follower rollers 77 and 78, however, the ejection unit 40, on account of the twin parallel linkage system 67–68 etc., is displaced at right angles to and toward the mold cavity plate. As a result of this arrangement, therefore, the ejector pins 72 penetrate (FIG. 4) into the mold cavities 33a and eject the molded articles 79 therefrom, with the ejecting force being progressively applied as the lowering of the carrier unit 39 continues at a constant force exerted by the piston 48. The ejection speed, i.e. the rate of penetration of the pins 72 into the mold cavities, becomes gradually slowed down in the process, which has a protective effect on the molded articles being ejected. The latter, of course, enter the chute defined at the mold cavity plate by the channel member 94 and drop through the same into the container 90 directly or after having been first weighed on a scale 93 and then automatically dispensed therefrom.

It is to be noted that the extraction of the sprues 37 from the mold cover plate 34 takes place throughout the entire descending motion of the carrier unit 39. In this regard, however, although the arrangement may be such that the rotating roller 83 of the sprue extraction unit will complete its wiping movement over the mold cover plate and the extraction of the sprues therefrom simultaneously with the ejection of the molded articles, it is preferred to utilize an arrangement in which the sprue extraction is completed just before the ejection of the molded articles takes place.

Upon ejection of the molded articles, the guide unit 42 ensures, as previously mentioned, that the molded articles can be dependably fed to the monitoring control scale 93, if desired, to check the weight of the ejected articles and compare it with a preset weight corresponding to the weight of all molded articles of a given cycle. If the result of the comparison is positive, the control system responsive to the signal output of the scale permits the subsequent molding cycle to be started, whereas if the result is not positive, the system interrupts production and emits an alarm signal for the operating staff. It is especially in connection with the use of flash-free molds that such a fully automated production of molded articles made of rubber becomes possible in a very simple manner, in view of the fact that the weight of the articles remains practically absolutely identical from cycle to cycle, so that the scale can be set for a very narrow tolerance or weight deviation, e.g. 0.1 g. It is then possible to determine by means of the monitoring scale not only whether all the molded articles have been reliably ejected from the mold but also whether defective articles, for instance as a result of incomplete filling of the mold cavities, have been produced. As a result, an increased output dependability can be achieved and the expenses incident to quality control can be lowered.

In addition, the guide unit serves to prevent any loss of molded articles or their dropping onto the lubricated tie rods or cross-head surfaces of the molding machine. Any contact by a molded article with lubricant such as grease or oil would render that article, as well as all other molded articles in the collector container which come in contact therewith, unfit for use; it would, in other words, produce rejects. This holds true in particular in the case of brake piston cups, pharmaceutical stoppers or similar items.

At the end of the removal process, the carrier unit 39 and the individual units 40, 41 and 42 supported thereby return along their respective but reversed paths into their rest positions. It is a particular advantage of the present invention that the entire removal process, beginning with the start-up out of the rest position and terminating with the return of all parts of the rest position, consumes, for example, less than 8 seconds. In that interval, the mold has been dependably and entirely mechanically freed from the molded articles and the waste molded material and is ready for a new mold cycle.

As previously mentioned, a molded material removal device according to the present invention can also be applied to vertical compression or transfer molding pressures. In such an environment, which can be visualized by imagining the machine illustrated in FIG. 1 to be turned through an angle of 90° so that the injection unit is situated on the top and the mold plates are arranged horizontally, the construction of the removal device 20 would be basically similar to that used in connection with the illustrated horizontal plunger or injection molding press. The sole difference in design and operation would reside in the fact that, in this arrangement, the guide unit 42 would be a box closed on all sides and open only toward the mold cavity plate, so that the ejected molded articles can drop into and would be retained in the said box which would subsequently be bodily moved out of the region of the mold.

It will be understood that the foregoing description of the device according to the present invention is for purposes of illustration only, and that the various structural and operational features and relationships herein disclosed are susceptible to a number of modifications and changes none of which entails any departure from the spirit and scope of the present invention as defined in the hereto appended claims.

I claim:

1. A device for removing molded material, in the form of molded articles and cured sprues, from the mold cavities provided in a mold cavity plate and the sprue passages provided in a mold cover plate, respectively, of a separable multi-plate mold; said device comprising:

A. a sprue extraction unit juxtaposed to the location of a first access space defined, upon opening of the mold, adjacent the face of said cover plate remote from said cavity plate, said extraction unit including a first member adapted to be moved through said first access space and past said face of said cover plate for engaging ends of said sprues projecting from said sprue passages, thereby to pull said sprues out of said passages;

B. a molded article ejection unit juxtaposed to the location of a second access space defined, upon opening of the mold, between said cavity and cover plates, said ejection unit comprising a second member adapted to be moved through said second access space both parallel and transversely to the plane of said cavity plate and having a plurality of ejector elements, identical in number and distribution to said mold cavities, which are directed toward said cavity plate upon location of said second member in said second access space and opposite said cavity plate;

C. a molded article guide unit juxtaposed to the location of a third access space defined, upon opening of the mold, adjacent the face of said cavity plate remote from said cover plate, said guide unit comprising a third member adapted to be moved through said third access space into closely confronting relation with said cavity plate, said third member being hollow and having an opening at a face thereof which, upon location of said third member in said third access space and opposite said cavity plate, is directed toward said cavity plate so as to enable the latter and said third member cooperatively to define an enclosure for receiving ejected molded articles;

D. means operatively associated with said extraction unit, said ejection unit and said guide unit for moving said extraction, ejection, and guide units jointly and generally linearly parallel to the planes of said cavity and cover plates into and out of said access spaces, respectively, when the same are formed upon opening of the mold; and E. cooperable means carried by said ejection unit and stationarily located adjacent said second access space, respectively, for interacting, upon movement of said ejection unit through said second access space past a predetermined point therein and in a direction parallel to the plane of said cavity plate, so as to displace said second member transversely to the plane of said cavity plate and thereby to enable said ejector elements to approach said cavity plate and eject the respective molded articles from said mold cavities and into said enclosure during inward movement of said ejection unit and to withdraw from said cavity plate during outward movement of said ejection unit.

2. A device as claimed in claim 1, wherein said second member is an ejector plate substantially coextensive with said cavity plate, and said ejector elements are pins projecting from said ejector plate.

3. A device as claimed in claim 2, wherein said ejector plate further includes interior passages adapted for connection to a source of pressurized air and terminating in orifices opening toward said cavity plate, for enabling the ejection of molded articles to be aided by blasts of pressurized air.

4. A device as claimed in claim 1, wherein said second member is an ejector plate substantially coextensive with said cavity plate, and said ejector elements are orifices communicating with interior passages in said ejector plate adapted for connection to a source of pressurized air, said orifices opening toward said cavity plate for enabling the ejection of molded articles to be effected by blasts of pressurized air.

5. A device as claimed in claim 1, further comprising a common carrier unit mounting said extraction, ejection and guide units, said means for moving said extraction, ejection and guide units being connected with said carrier unit.

6. A device as claimed in claim 5, wherein said carrier unit includes a frame, and a parallelogram linkage suspension system pivotally connected at one end to said frame, said ejection unit includes a support structure pivotally connected to the other, free end of said parallelogram linkage suspension system and supporting said second member, and said cooperable means includes roller means carrier by said parallelogram linkage suspension system at said free end thereof, and stop or abutment means engageable by said roller means.

7. A device as claimed in claim 1, wherein said third member is laterally closed on all but one portion of the periphery thereof and coacts with said cavity plate so that said enclosure is in the form of a chute through which ejected molded articles can slide to a receiving location.

8. A device as claimed in claim 1, wherein said third member is laterally closed on all portions of the periphery thereof and coacts with said cavity plate so that said enclosure is in the form of a receptacle in which ejected molded articles can be retained for transfer to a receiving location.

9. In combination with a molding machine which
  (a) has a pair of cross-heads arranged for relative separating and approaching movement therebetween, with one of said cross-heads including a molding compound source unit having its discharge end opening into the space between said cross-heads,
  (b) is adapted to have interposed in said space between said cross-heads a separable multi-plate mold including a cavity plate provided with a plurality of mold cavities therein, a cover plate interposed between said cavity plate and said one cross-head and provided with a plurality of sprue passages therein corresponding with said mold cavities in said cavity plate for enabling molding compound to pass from said source unit into said mold cavities, and a bottom plate interposed between said cavity plate and the other cross-head, and
  (c) has means for mounting said plates between said cross-heads so as to enable said plates, upon closing of the machine by a relative approaching of said cross-heads to each other, to be pressed tightly against one another and, upon opening of the machine by a relative separation of said cross-heads from each other, to assume separated positions defining first, second and third access spaces between respectively, said cover plate and said one cross-head, said cover plate and said cavity plate, and said cavity plate and said bottom plate;

the improvement comprising a device for entirely mechanically removing molded material, in the form of molded articles and cured sprues, from said mold cavities and said sprue passages, respectively, wherein said device includes:

A. a sprue extraction unit arranged adjacent said cross-heads in a position juxtaposed to the location of said first access space, said extraction unit comprising a first member adapted to be moved through said first access space and past said face of said cover plate for engaging ends of said sprues projecting from said sprue passages, thereby to pull said sprues out of said passages;

B. a molded article ejection unit arranged adjacent said cross-heads in a position juxtaposed to the location of said second access space, said ejection unit comprising a second member adapted to be moved through said second access space both generally parallel and transversely to the plane of said cavity plate and having a plurality of ejector elements, identical in number and distribution to said mold cavities, which are directed toward said cavity plate upon location of said second member in said second access space and opposite said cavity plate;

C. a molded article guide unit arranged adjacent said cross-heads in a position juxtaposed to the location of said third access space, said guide unit comprising a third member adapted to be moved through said third access space into closely confronting relation with said cavity plate, said third member being hollow and having an opening at a face thereof which, upon location of said third member in said third access space and opposite said cavity plate, is directed toward said cavity plate so as to enable the latter and said third member cooperatively to define an enclosure for receiving ejected molded articles;

D. means arranged adjacent swaid cross-heads and operatively associated with said extraction unit, said ejection unit and said guide unit for moving said extraction, ejection, and guide units jointly and generally linearly parallel to the planes of said cavity and cover plates into and out of said first, second and third access spaces, respectively, when the same are formed upon opening of the machine; and E. cooperable means carried by said ejection unit and stationarily located adjacent said second access space, respectively, for interacting, upon movement of said ejection unit through said second access space past a predetermined point therein and in a direction generally parallel to the plane of said cavity plate, so as to displace said second member generally transversely to the plane of said cavity plate and thereby to enable said ejector elements to approach said cavity plate and eject the respective molded articles from said mold cavities. and into said enclosure during inward movement of said ejection unit and to withdraw from said cavity plate during outward movement of said ejection unit.

10. A molding machine as claimed in claim 9, wherein said second member is an ejector plate substantially coextensive with said cavity plate, and said ejector elements are pins projecting from said ejector plate.

11. A molding machine as claimed in claim 10, wherein said ejector plate further includes interior passages adapted for connection to a source of pressurized air and terminating in orifices opening toward said cavity plate, for enabling the ejection of molded articles to be aided by blasts of pressurized air.

12. A molding machine as claimed in claim 9, wherein said second member is an ejector plate substantially coextensive with said cavity plate, and said ejector elements are orifices communicating with interior passages in said ejector plate adapted for connection to a source of pressurized air, said orifices opening toward said cavity plate for enabling the ejection of molded articles to be effected by blasts of pressurized air.

13. A molding machine as claimed in claim 9, wherein said device further includes a common carrier unit mounting said extraction, ejection and guide units, and means mounting said carrier unit for movement toward and away from said space between said cross-heads.

14. A molding machine as claimed in claim 13, wherein said moving means comprises a fluid pressure cylinder connected to one of said mounting means and said carrier unit, and a piston movable in said cylinder and having a piston rod extending therefrom and connected with the other of said mounting means and said carrier unit.

15. A molding machine as claimed in claim 13, wherein one of said cross-heads is stationary and the other cross-head is movable toward and away therefrom, said mounting means comprises a support member fixed to said one cross-head, and first guide means stationarily carried by said support member, and said carrier unit comprises a frame supporting said extraction, ejection and guide units, and second guide means secured to said frame and movably engaging said first guide means, said frame and second guide means coacting to guide said carrier unit along its path of movement and to brace said carrier unit against twisting out of said path during such movement.

16. A molding machine as claimed in claim 15, wherein said first guide means comprises a rigid guide plate extending along said path of movement of said carrier unit, and said second guide means comprises at least two pairs of guide rollers arranged at spaced portions of said frame of said carrier unit, said guide rollers of each pair being in rolling contact with a respective marginal region of said guide plate at both surfaces of the latter.

17. A molding machine as claimed in claim 13, wherein said carrier unit includes a frame, and a parallelogram linkage suspension system pivotally connected at one end to said frame, said ejection unit includes a support structure pivotally connected to the other, free end of said parallelogram linkage suspension system and supporting said second member, and said cooperable means includes roller means carried by said parallelogram linkage suspension system at said free end thereof, and stop or abutment means engageable by said roller means.

18. A molding machine as claimed in claim 17, wherein said stop or abutment means is carried by said cavity plate.

19. A molding machine as claimed in claim 13, wherein said third member is laterally closed on all but one portion of the periphery thereof and coacts with said cavity plate so that said enclosure is in the form of a chute through which ejected molded articles can slide to a receiving location.

20. A molding machine as claimed in claim 19, further comprising a partition arranged adjacent said crossheads on the side of said space therebetween remote from the location of said carrier unit and in a location where it is aligned with said cavity plate when the machine is opened, said partition defining separate positions adjacent said first and third access spaces for respective collector containers for receiving extracted sprues and ejected molded articles.

21. A molding machine as claimed in claim 20, further comprising a monitoring scale interposed between the location of said third access space and the position of the collector container for ejected molded articles, for determining the weight of all ejected molded articles of a given mold cycle and comparing that weight to a theoretic yield value for that cycle.

22. A molding machine as claimed in claim 13, wherein said third member is laterally closed on all portions of the periphery thereof and coacts with said cavity plate so that said enclosure is in the form of a receptacle in which ejected molded articles can be retained for transfer to a receiving location.

23. A molding machine as claimed in claim 13, wherein said sprue extraction unit comprises a support arm secured to said carrier unit, a rotatable wiping roller journaled on said support arm in a position to be translated past said cover plate at a close uniform spacing from the surface thereof, and an electric motor mounted on said carrier unit and connected with said wiping roller for rotating the same in a sense, as viewed at the surface of said cover plate, which is counter to the direction of translational movement of said wiping roller into said first access space.

24. A molding machine as claimed in claim 23, wherein said wiping roller is arranged with its axis of rotation oriented obliquely to the direction of movement of said extraction unit through said first access space.

25. A molding machine as claimed in claim 13, further comprising first and second elastic stripper members carried by said ejection and guide units, respectively, said first stripper member protruding from said ejection unit in the direction toward said extraction unit and being operable, upon movement of said ejection unit through said second access space, to strip off the surface of said cover plate directed toward said cavity plate any molded article which may have adhered to said cover plate, and said second stripper member protruding from said guide unit in the direction away from said ejection unit and being operable, upon movement of said guide unit through said third access space, to strip off the surface of said bottom plate directed toward said cavity plate any molded article which may have adhered to said bottom plate.

26. A device for removing molded material, in the form of molded articles and cured sprues, from the mold cavities provided in a mold cavity plate and the sprue passages provided in a mold cover plate, respectively, of a separable multi-plate mold; said device comprising:

A. a sprue extraction unit juxtaposed to the location of a first access space defined, upon opening of the mold, adjacent the face of said cover plate remote from said cavity plate, said extraction unit including a first member adapted to be moved through said first access space and past said face of said cover plate for engaging ends of said sprues projecting from said sprue passages, thereby to pull said sprues out of said passages;

B. a molded article ejection unit juxtaposed to the location of a second access space defined, upon opening of the mold, between said cavity and cover plates, said ejection unit comprising a second member adapted to be moved through said second access space both parallel and transversely to the plane of said cavity plate and having a plurality of ejector elements, identical in number and distribution to said mold cavities, which are directed toward said cavity plate upon location of said second member in said second access space and opposite said cavity plate;

C. means operatively associated with said extraction unit and said ejection unit for moving said extraction and ejection units jointly and generally linearly parallel to the planes of said cavity and cover plates into and out of said access spaces, respectively, when the same are formed upon opening of the mold; and D. cooperable means carried by said ejection unit and stationarily located adjacent said second access space, respectively, for interacting, upon movement of said ejection unit through said second access space past a predetermined point therein and in a direction parallel to the plane of said cavity plate, so as to displace said second member transversely to the plane of said cavity plate and thereby to enable said ejector elements to approach said cavity plate and eject the respective molded articles from said mold cavities during inward movement of said ejection unit and to withdraw from said cavity plate during outward movement of said ejection unit.

27. A device as claimed in claim 26, wherein said second member is an ejector plate substantially coextensive with said cavity plate, and said ejector elements are pins projecting from said ejector plate.

28. A device as claimed in claim 27, wherein said ejector plate further includes interior passages adapted for connection to a source of pressurized air and terminating in orifices opening toward said cavity plate, for enabling the ejection of molded articles to be aided by blasts of pressurized air.

29. A device as claimed in claim 26, wherein said second member is an ejector plate substantially coextensive with said cavity plate, and said ejector elements are orifices communicating with interior passages in said ejector plate adapted for connecting to a source of pressurized air, said orifices opening toward said cavity plate for enabling the ejection of molded articles to be effected by blasts of pressurized air.

30. A device as claimed in claim 26, further comprising a common carrier unit mounting said extraction and ejection units, said means for moving said extraction and ejection units being connected with said carrier unit.

31. A device as claimed in claim 30, wherein said carrier unit includes a frame, and a parallelogram linkage suspension system pivotally connected at one end to said frame, said ejection unit includes a support structure pivotally connected to the other, free end of said parallelogram linkage suspension system and supporting said second member, and said cooperable means includes roller means carried by said parallelogram linkage suspension system at said free end thereof, and stop or abutment means engageable by said roller means.

32. In combination with a molding machine which
(a) has a pair of cross-heads arranged for relative separating and approaching movement therebetween, with one of said cross-heads including a molding compound source unit having its discharge end opening into the space between said cross-heads,
(b) is adapted to have interposed in said space between said cross-heads a separable multi-plate mold including a cavity plate provided with a plurality of mold cavities therein, a cover plate interposed between said cavity plate and said one cross-head and provided with a plurality of sprue passages therein corresponding with said mold cavities in said cavity plate for enabling molding compound to pass from said source unit into said mold cavities, and a bottom plate interposed between said cavity plate and the other cross-head, and
(c) has means for mounting said plates between said cross-heads so as to enable said plates, upon closing of the machine by a relative approaching of said cross-heads to each other, to be pressed tightly against one another and, upon opening of the machine by a relative separation of said cross-heads from each other, to assume separated positions defining first, second and third access spaces between, respectively, said cover plate and said one cross-head, said cover plate and said cavity plate, and said cavity plate and said bottom plate;
the improvement comprising a device for entirely mechanically removing molded material, in the form of molded articles and cured sprues, from said mold cavities and said sprue passages, respectively, wherein said device includes:
A. a sprue extraction unit arranged adjacent said cross-heads in a position juxtaposed to the location of said first access space, said extraction unit comprising a first member adapted to be moved through said first access space and past said face of said cover plate for engaging ends of said sprues projecting from said sprue passages, thereby to pull said sprues out of said passages;
B. a molded article ejection unit arranged adjacent said cross-heads in a position juxtaposed to the location of said second access space, said ejection unit comprising a second member adapted to be moved through said second access space both generally parallel and transversely to the plane of said cavity plate and having a plurality of ejector elements, identical in number and distribution to said mold cavities, which are directed toward said cavity plate upon location of said second member in said second access space and opposite said cavity plate;
C. means arranged adjacent said cross-heads and operatively associated with said extraction unit and said ejection unit for moving said extraction and ejection units jointly and generally linearly parallel to the planes of said cavity and cover plates into and out of said first and second access spaces, respectively, when the same are formed upon opening of the machine; and
D. cooperable means carried by said ejection unit and stationarily located adjacent said second access space, respectively, for interacting, upon movement of said ejection unit through said second access space past a predetermined point therein and in a direction generally parallel to the plane of said cavity plate, so as to displace said second member generally transversely to the plane of said cavity plate and thereby to enable said ejector elements to approach said cavity plate and eject the respective molded articles from said mold cavities and into said third access space during inward movement of said ejection unit and to withdraw from said cavity plate during outward movement of said ejection unit.

33. A molding machine as claimed in claim 32, wherein said second member is an ejector plate substantially coextensive with said cavity plate, and said ejector elements are pins projecting from said ejector plate.

34. A molding machine as claimed in claim 33, wherein said ejector plate further includes interior passages adapted for connection to a source of pressurized air and terminating in orifices opening toward said cavity plate, for enabling the ejection of molded articles to be aided by blasts of pressurized air.

35. A molding machine as claimed in claim 32, wherein said second member is an ejector plate substantially coextensive with said cavity plate, and said ejector elements are orifices communicating with interior passages in said ejector plate adapted to connection to a source of pressurized air, said orifices opening toward said cavity plate for enabling the ejection of molded articles to be effected by blasts of pressurized air.

36. A molding machine as claimed in claim 32, wherein said device further includes a common carrier unit mounting said extraction and ejection units, and means mounting said carrier unit for movement toward and away from said space between said cross-heads.

37. A molding machine as claimed in claim 36, wherein said moving means comprises a fluid pressure cylinder connected to one of said mounting means and said carrier unit, and a piston movable in said cylinder and having a piston rod extending therefrom and connected with the other of said mounting means and said carrier unit.

38. A molding machine as claimed in claim 36, wherein one of said cross-heads is stationary and the other cross-head is movable toward and away therefrom, said mounting means comprises a support member fixed to said one cross-head, and first guide means stationarily carried by said support member, and said carrier unit comprises a frame supporting said extraction and ejection units, and second guide means secured to said frame and movably engaging said first guide means, said first and second guide means coacting to guide said carrier unit along its path of movement and to brace said carrier unit against twisting out of said path during such movement.

39. A molding machine as claimed in claim 38, wherein said first guide means comprises a rigid guide plate extending along said path of movement of said carrier unit, and said second guide means comprises at least two pairs of guide rollers arranged at spaced portions of said frame of said carrier unit, said guide rollers of each pair being in rolling contact with a respective marginal region of said guide plate at both surfaces of the latter.

40. A molding machine as claimed in claim 36, wherein said carrier unit includes a frame, and a parallelogram linkage suspension system pivotally connected at one end to said frame, said ejection unit includes a support structure pivotally connected to the other, free end of said parallelogram linkage suspension system and supporting said second member, and said cooperable means includes roller means carried by said parallelogram linkage suspension system at said free end thereof, and stop or abutment means engageable by said roller means.

41. A molding machine as claimed in claim 40, wherein said stop or abutment means is carried by said cavity plate.

42. A molding machine as claimed in claim 36, further comprising a partition arranged adjacent said crossheads on the side of said space therebetween remote from the location of said carrier unit and in a location where it is aligned with said cavity plate when the machine is opened, said partition defining separate positions adjacent said first and third access spaces for respective collector containers for receiving extracted sprues and ejected molded articles.

43. A molding machine as claimed in claim 42, further comprising a monitoring scale interposed between the location of said third access space and the position of the collector container for ejected molded articles, for determining the weight of all ejected molded articles of a given mold cycle and comparing that weight to a theoretic yield value for that cycle.

44. A molding machine as claimed in claim 36, wherein said sprue extraction unit comprises a support arm secured to said carrier unit, a rotatable wiping roller journaled on said support arm in a position to be translated past said cover plate at a close uniform spacing from the surface thereof, and an electric motor mounted on said carrier unit and connected with said wiping roller for rotating the same in a sense, as viewed at the surface of said cover plate, which is counter to the direction of translational movement of said wiping roller into said first access space.

45. A molding machine as claimed in claim 44, wherein said wiping roller is arranged with its axis of rotation oriented obliquely to the direction of movement of said extraction unit through said first access space.

* * * * *

UNITED STATES PATENT AND TRADEMARK OFFICE
CERTIFICATE OF CORRECTION

PATENT NO. : 4,124,352
DATED : November 7, 1978
INVENTOR(S) : LAMBERT M. PASCH

It is certified that error appears in the above–identified patent and that said Letters Patent are hereby corrected as shown below:

Column 2, line 52, for "the" read --a--. Column 10, line 47, for "pressures" read --presses--. Column 12, line 27, for "carrier" read --carried--. Column 13, lines 12/13, for "past said face of said cover plate" read --past said cover plate--; line 41, for "swaid" read --said--. Column 16, line 51 for "connecting" read --connection--. Column 17, lines 41/42, for "past said face of said cover plate" read --past said cover plate--.

Signed and Sealed this

Twenty-seventh Day of March 1979

[SEAL]

Attest:

RUTH C. MASON
Attesting Officer

DONALD W. BANNER
Commissioner of Patents and Trademarks